April 21, 1936.  E. W. GENT  2,038,277
ELECTRICAL METER
Filed Jan. 10, 1935

INVENTOR
E. W. GENT
BY
G. H. Stevenson
ATTORNEY

Patented Apr. 21, 1936

2,038,277

UNITED STATES PATENT OFFICE 2,038,277

ELECTRICAL METER

Edgar W. Gent, Morristown, N. J., assignor to Bell Telephone Laboratories, Incorporated, New York, N. Y., a corporation of New York Application January 10, 1935, Serial No. 1,118

3 Claims. (Cl. 171—95)

This invention relates to electrical meters for high voltage circuits, particularly current meters.

An object of the invention is to simplify the construction of electrical meters for high voltage circuits.

In a specific preferred embodiment of this invention in a high voltage current meter, the conductor which carries the current to be measured is surrounded by a toroidal winding and the current induced in the winding is supplied to an electrical lamp, the light from which is focussed on a photoelectric cell which has its output connected to a meter calibrated to give an indication of the current in the high voltage conductor.

Figure 1:
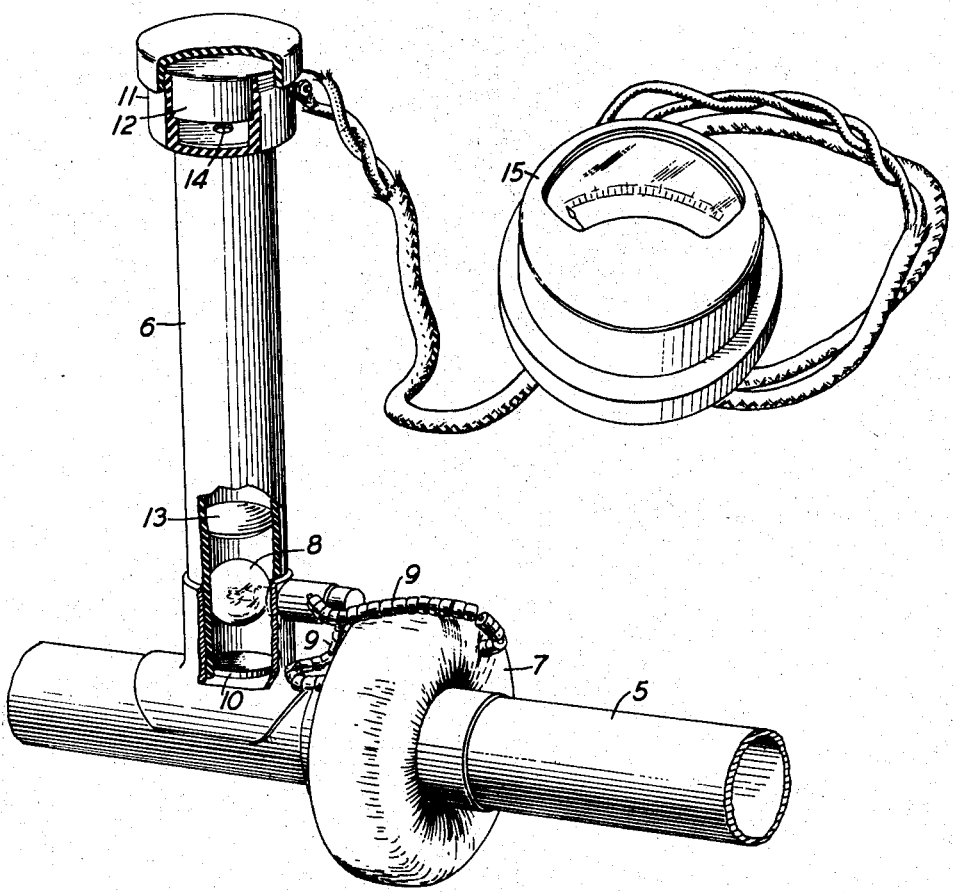
Figure 2:
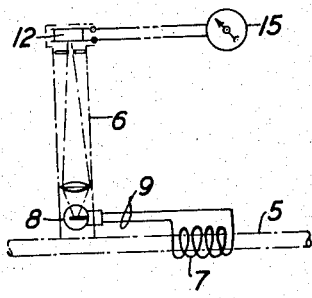

This invention can be more readily understood by reference to the following detailed description in connection with the drawing in which Fig. 1 shows a perspective view, and Fig. 2 shows a schematic diagram of one embodiment of the invention, similar reference numerals being used in connection with both figures.

Mounted on the high voltage bus-bar 5 which carries an alternating current which it is desired to measure is a cylinder 6 of insulating material which is opaque to light. A toroidal winding 7 is also mounted on the bus-bar 5. Near the lower end of the cylinder 6 there is mounted an electric light bulb 8 which is connected to the toroidal winding 7 by means of wires 9. Mounted below the bulb 8 is a reflecting mirror 10. At the upper end of the cylinder 6 there is provided a mounting 11 containing a photoelectric cell 12. A condensing lens 13 above the light bulb 8 focusses the light therefrom on the photoelectric cell 12 through the aperture 14. The photoelectric cell is connected to an indicating meter 15.

The operation of the unit is as follows: When alternating current flows through the bus-bar 5 it induces a proportional current in the toroidal coil 7. This current is supplied to the lamp 8 which is preferably a tungsten lamp and the light output of the lamp will be proportional to the current in the coil 7. The light radiated by the lamp 8 is focussed on the sensitive surface of the photoelectric cell 12 thereby producing a current which is in turn proportional to the light intensity and which is read by the indicating meter 15. By calibrating the meter 15 in terms of the current in the bus-bar 5 a direct indication of that current may be obtained.

By this arrangement the only physical connection between the high voltage bus-bar 5 and the indicating meter 15 is through the medium of the light beam so that the indicating meter 15 is entirely electrically insulated from the high voltage bus. Obviously the light path may be of any desired length to obtain the insulation necessary to meet the requirtments for any voltage at which the bus-bar 5 may be operated.

What is claimed is:

1. A meter for use in high voltage circuits comprising a winding inductively coupled to the circuit, an electrical lamp connected to said winding, a light sensitive cell, means for directing the light from said lamp on said cell, and a meter for measuring the electrical output of said cell.

2. A current meter for use with high voltage buses, comprising a toroidal coil around said bus, connections from said coil to a lamp, a light sensitive cell, means for concentrating and directing the light from said lamp on said cell, and means for measuring the output of said cell on a device calibrated in terms of the current flowing in the bus.

3. A current meter for use with high voltage conductors, comprising a toroidal coil located around and directly upon said conductor, an electric lamp energized by the current induced in said coil, means comprising an opaque insulator tube for efficiently directing the light from said lamp on a light sensitive cell, and means for measuring the output of said cell on a device calibrated in terms of the current flowing in the bus.

EDGAR W. GENT.